(No Model.)
W. T. WATERS.
ELECTRIC MOTOR.
No. 293,929. Patented Feb. 19, 1884.
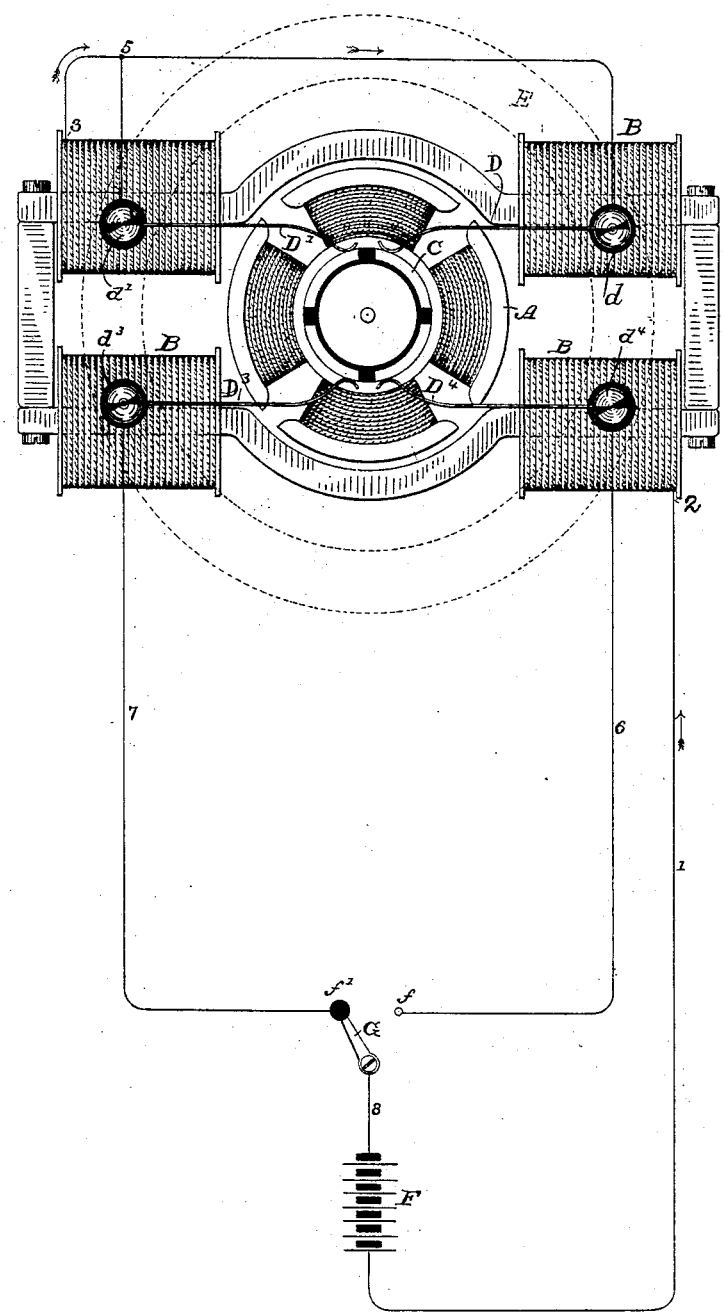
WITNESSES
INVENTOR
William T. Waters,
By his Attorney
Frankland Jannus

UNITED STATES PATENT OFFICE.

WILLIAM T. WATERS, OF ATLANTA, GEORGIA.

ELECTRIC MOTOR.

SPECIFICATION forming part of Letters Patent No. 293,929, dated February 19, 1884.

Application filed November 28, 1883. (No model.)

*To all whom it may concern:*

Be it known that I, WILLIAM T. WATERS, a citizen of the United States, residing at Atlanta, in the county of Fulton and State of Georgia, have invented certain new and useful Improvements in Electric Motors; and I do declare the following to be a full, clear, and exact description of the invention, such as will enable others skilled in the art to which it appertains to make and use the same, reference being had to the accompanying drawing, and to the letters and figures of reference marked thereon, which form a part of this specification.

My invention relates to improvements in methods of and means for controlling the operation of electric motors or engines, and it is specially designed to enable a motor and mechanism driven thereby to be started, stopped, and reversed at any distance from the operator that the exigencies of the case may require.

In the drawing I have shown a motor in elevation, together with a theoretical diagram of the circuit-connections necessary to carry out my invention.

A represents an ordinary four-pole armature, that may be of any well-known construction adapted to the present use.

B B are the field-magnets, also of ordinary construction.

C is the commutator, which has as many segments as the armature has poles—in this instance four.

D D' D$^3$ D$^4$ are commutator-brushes, of which I provide two complete sets, all of which remain in contact with the commutator. The said brushes are mounted upon a face-plate, E, (shown in dotted lines,) or any other equally well-known means of support which will allow of the entire set of brushes being moved around the periphery of the commutator, and permanently adjusted so as to intersect the opposing lines of commutation.

F is a generator or other source of electricity.

In order to be able to reverse the direction of rotation of the armature, it is necessary to send the current through different portions thereof with respect to the poles of the field-magnets, and in order to accomplish this I provide for sending the current, after it leaves the field-magnets, through either side of the armature, as follows:

The conductor 1 leads from the source of electricity, F, to the field-magnets B, entering at 2, and after traversing their coils issuing at 3, from whence it passes to the binding-post $d$, which is permanently connected with the brush D. The said conductor branches at 5, and from that point is permanently connected to the brush D', the outgoing circuit, it will be seen, thus terminating at the two upper brushes, D and D', alike.

Upon the lower side of the commutator are placed two brushes, D$^3$ and D$^4$, (on opposite sides thereof,) and each of these brushes is provided with an independent conductor or circuit, 6 and 7, which extend from said brushes to contact-points $f\,f'$, from either one of which a manual switch, G, leads through wire 8 back to the source of electricity, F. As shown, the current would pass from F, through 1, to the field-magnets, thence at 3 to binding-post $d^4$, by way of brush D into armature, out by brush D$^3$, by post $d^3$, conductor 7, contact $f'$, switch G, and wire 8, back to the source of electricity, F. In order to reverse the rotation of the motor, the switch G is shifted to the contact $f$, when the current, having no other outlet, will pass through the armature on the opposite sides, (and its direction of rotation will be reversed,) returning through the brush D', leaving by brush D$^4$, and completing the circuit through the conductor 6 and the switch G. By opening the circuit at $f$ or $f'$, one or other of the return-circuits 6 and 7 becomes inoperative, and the current is thereby compelled to pass through the opposite set of brushes.

Having thus described my invention, I claim—

In an electric motor, the combination of an outgoing circuit with two or more return-wires, a double set of commutator-brushes, each set being connected to one outgoing but to a different return wire, and an adjustable face-plate or frame upon which the said brushes are mounted, so as to be readily placed on the line of commutation, substantially as set forth.

In testimony whereof I affix my signature in presence of two witnesses.

WILLIAM T. WATERS.

Witnesses:
 FRANKLAND JANNUS,
 NEWTON L. COLLAMER.